US00RE34347E

United States Patent [19]

VanErden et al.

[11] E Patent Number: Re. 34,347

[45] Reissued Date of Patent: Aug. 17, 1993

[54] RECLOSABLE BAG ESPECIALLY SUITABLE FOR CEREAL PACKAGING, AND METHOD

[75] Inventors: Donald L. VanErden, Wildwood, Ill.; Bruce J. Maliner, Fort Lee, N.J.

[73] Assignee: Minigrip, Inc., Orangeburg, N.Y.

[21] Appl. No.: 402,545

[22] Filed: Aug. 18, 1989

Related U.S. Patent Documents

Reissue of:

[64] Patent No.: 4,759,642
Issued: Jul. 26, 1988
Appl. No.: 895,311
Filed: Aug. 11, 1986

[51] Int. Cl.[5] ..... B65D 33/24; B65D 30/10

[52] U.S. Cl. ..... 383/63; 383/61; 383/94; 383/121; 220/403

[58] Field of Search ..... 383/61, 63, 94, 104, 383/114, 121, 122, 123, 124, 93, 65; 220/403, 408, 462, 410; 53/175, 449, 450, 451, 452, 455; 493/189, 199

[56] References Cited

U.S. PATENT DOCUMENTS

| | | | |
|---|---|---|---|
| Re. 29,331 | 8/1977 | Naito | 383/63 X |
| 2,978,769 | 4/1961 | Harrah | 383/65 X |
| 3,172,443 | 3/1965 | Ausnit | 383/61 X |
| 3,181,583 | 5/1965 | Lingenfelter | 383/61 X |
| 3,357,152 | 12/1967 | Geigel | 383/121 X |
| 3,375,969 | 4/1968 | Davis, Jr. | 383/122 |
| 3,473,589 | 10/1969 | Götz | 383/94 X |
| 3,945,403 | 3/1976 | Noguchi | 383/63 X |
| 3,990,627 | 11/1976 | Olson | 383/61 |
| 4,246,288 | 1/1981 | Sanborn, Jr. | 383/63 X |
| 4,355,494 | 10/1982 | Tilman | 53/416 |
| 4,453,370 | 6/1984 | Titchenal | 53/455 |
| 4,528,224 | 7/1985 | Ausnit | 383/63 X |
| 4,561,107 | 12/1985 | Herder | 383/122 X |
| 4,617,683 | 10/1986 | Christoff | 383/63 |
| 4,782,951 | 11/1988 | Griesbach et al. | 206/484 |
| 4,832,505 | 5/1989 | Ausnit et al. | 383/65 X |

FOREIGN PATENT DOCUMENTS

| | | | |
|---|---|---|---|
| 280826 | 10/1966 | Australia | 220/460 |
| 248555 | 12/1987 | European Pat. Off. | 383/63 |
| 1137074 | 5/1957 | France | 220/460 |
| 1215335 | 4/1960 | France | 220/460 |
| 1342346 | 9/1963 | France | 383/121 |
| 588982 | 2/1959 | Italy | 220/460 |
| 159056 | 1/1979 | Netherlands | 220/403 |

*Primary Examiner*—Allan N. Shoap
*Assistant Examiner*—Jes F. Pascua
*Attorney, Agent, or Firm*—Hill, Steadman & Simpson

[57] ABSTRACT

A four corner bag especially suitable for packaging dry cereal, and method of making the bag from sheet or plastic film material. The bag is provided with opposite wall panels joined at a closed bag bottom and closed opposite sides, the panels defining an openable bag top provided with a reclosable fastener along the inner ends of upstanding pull flanges. Lower corner chamfer seals extend from the closed bottom to the sides of the bag. Upper corner chamfer seals extend from adjacent to the ends of the reclosable fastener to the top edges of the pull flanges. Thereby, when the bag is filled, the chamfer seals will free the four corners of the bag from interfering with easy reception and packing of the filled bag in a fairly close fitting carton.

15 Claims, 3 Drawing Sheets

M
T
T

M'
31
28
32
25
37
35
33
34
T
27
29
32'
28'
30'
38
31'
37'
T'
33'
35'
27'

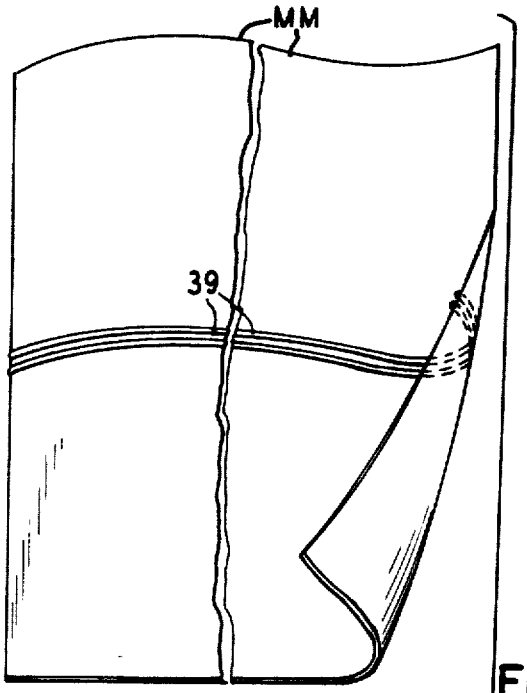
FIG.5
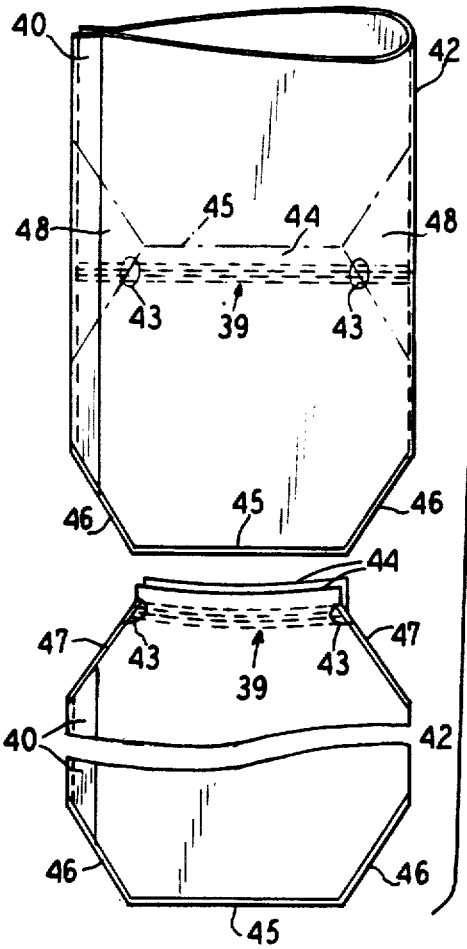
FIG.6
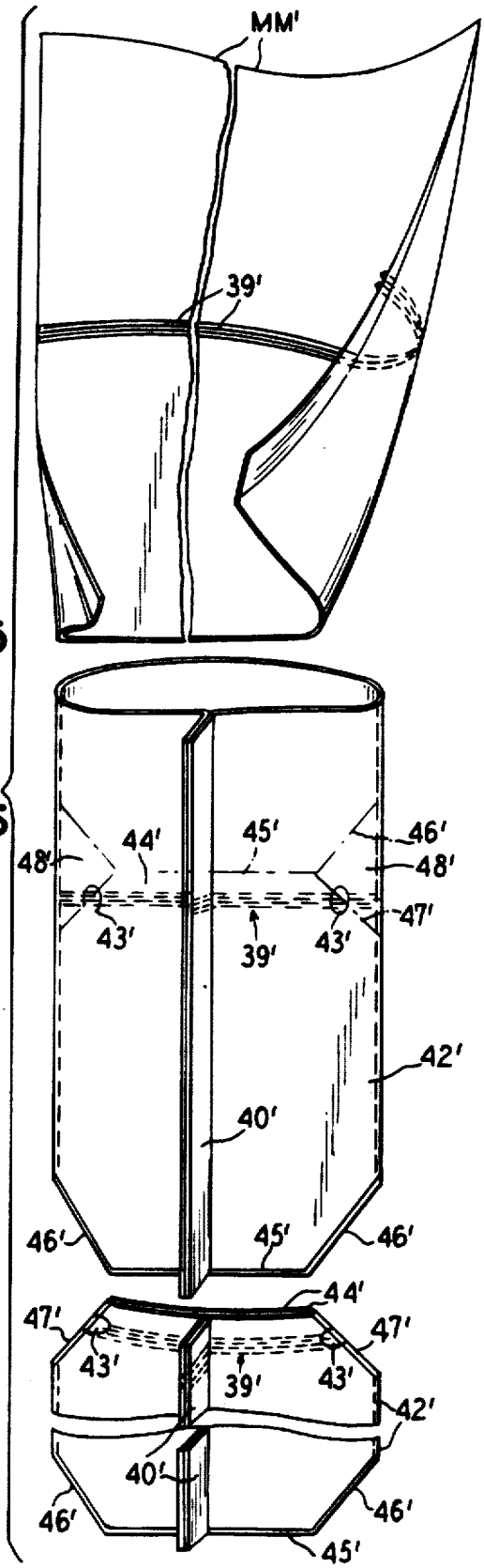

RECLOSABLE BAG ESPECIALLY SUITABLE FOR CEREAL PACKAGING, AND METHOD

Matter enclosed in heavy brackets [ ] appears in the original patent but forms no part of this reissue specification; matter printed in italics indicates the additions made by reissue.

BACKGROUND OF THE INVENTION

This invention relates to the art of making reclosable bags, and is particularly concerned with providing such bags which will be especially suitable for cereal packaging, and the method of making such bags.

Packaging of various products, and in particular, dry cereals, and the like, is customarily effected by sealing the product in paper or like bags stored in suitable size boxes or cartons. One of the disadvantages of this kind of packaging is that when the package has been opened for dispensing part of the contents, resealing the package for retaining freshness and taste and for retaining the contents against spillage is difficult, and at least hap-hazard. The cost of equipping paper or like bags with reclosable fastener means presents a [prlblem] *problem* which even if not impossible to accomplish, adds too greatly to the packaging cost to be practical.

Bags formed from single ply or laminated plastic material and equipped with reclosable fastener means often referred to as zipper, are well known for general utility in packaging many products including edibles, but insofar as we are presently informed, there has been no successful adaptation of this kind of bag for packaging edible products such as dry cereal and the like in storage cartons. The components of plastic bags are generally secured together by heat or fusion sealing, which has heretofor presented interference with insertion of the filled, puffy bags of product in the storage cartons, especially by means of automatic packaging machinery as is common practice with the sealed paper filled bags, where corners of the bags are tucked in or gusseted to facilitate the automatic packaging machine handling and carton filling.

SUMMARY OF THE PRESENT INVENTION

The present invention is primarily directed to the adaptation of reclosable plastic bags for dry cereal or like packaging.

An important object of the present invention is to provide a new and improved reclosable bag structure for replacing conventional paper bags in the packaging of products such as a dry cereal.

Another object of the invention is to provide a new and improved plastic packaging device for products such as dry cereal and which will permit convenient and effective reclosing of the package when only part of the contents have been dispensed, and thus the preservation of freshness and taste in the package after it has been opened.

A further object of the invention is to provide a new and improved method of making reclosable plastic bags especially adapted for packaging bulky product such as dry cereal.

To this end, the invention provides a four corner bag formed from sheet or plastic film material and having opposite wall panels joined at a closed bag bottom and closed opposite sides, and said panels defining an openable bag top provided with a reclosable fastener along the inner ends of upstanding pull flanges and comprising lower corner chamfer seals extending from the bag bottom to the bag sides, and upper corner chamfer seals extending from adjacent to the ends of the pull flanges, so that when the bag is filled, the chamfer seals will free the four corners of the bag from interfering with easy reception and packing of the filled bag in a fairly close fitting carton.

The invention also provides a new and improved method of making such bags.

BRIEF DESCRIPTION OF THE DRAWINGS

Other objects, features and advantages of the present invention will be readily apparent from the following description of a representative embodiment thereof, taken in conjunction with the accompanying drawings although variations and modifications may be effected without departing from the spirit and scope of the novel concepts embodied in the disclosure, and in which

FIGS. 3, 4, 5 and 6 are views similar to FIG. 2, but depicting various modifications.

DETAILED DESCRIPTION

Figures 1, 2:
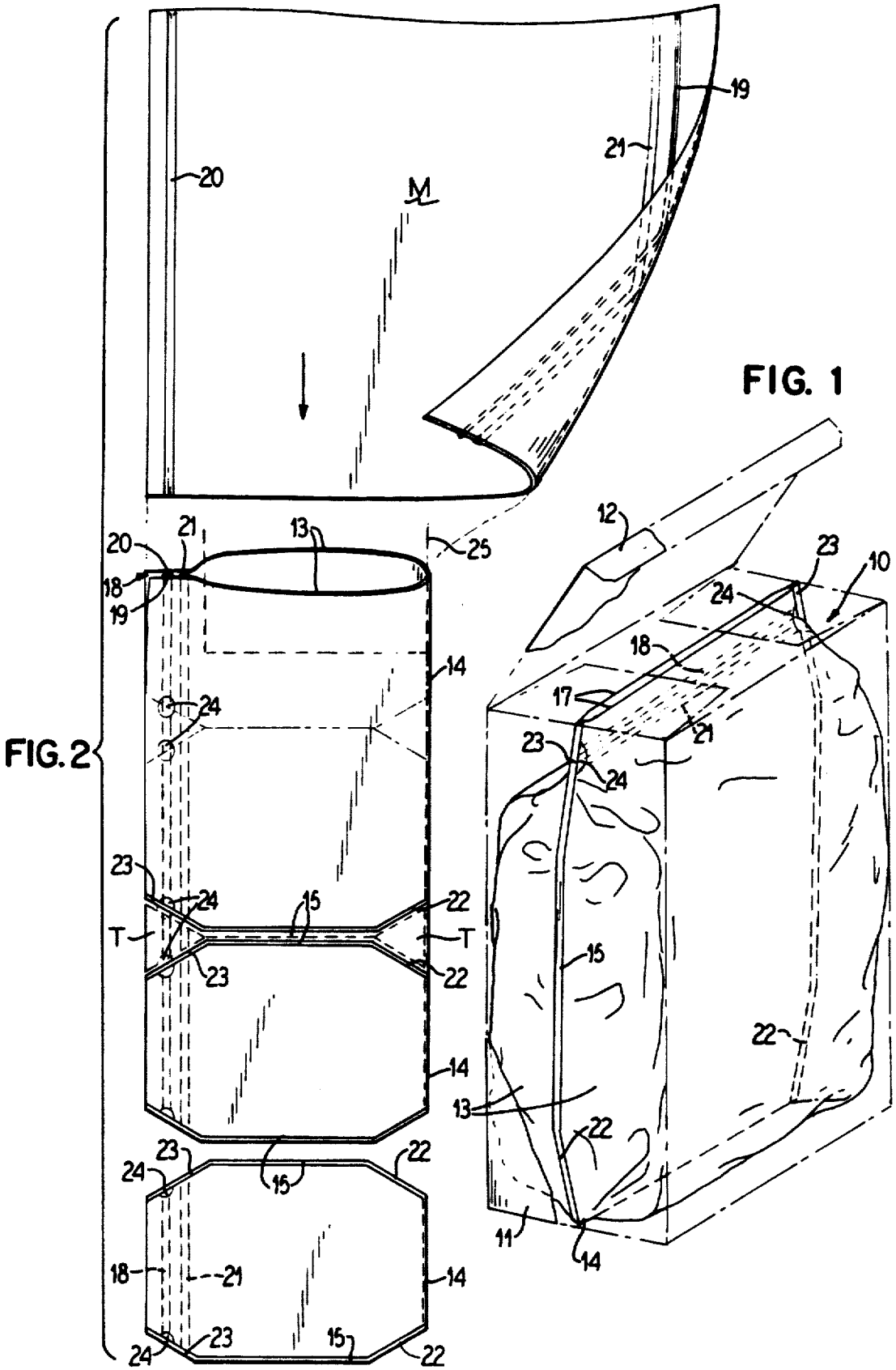
FIG. 1 is a more or less schematic view of a bag according to the present invention received within a storage and handling carton.
FIG. 2 is a generally schematic view illustrating a method of making one form of bag according to the present invention.

Referring to FIG. 1, a reclosable bag 10 especially suitable for cereal packaging is depicted as received in a fairly close fitting storage and handling box or carton 11 which may be sealed closed except for an openable top reclosable by means of a hinged cover 12.

The bag 10 comprises opposite wall panels 13 (FIGS. 1 and 2) closed at a bottom end 14 as by means of a fold of the sheet or film material of the wall panels 13. At opposite sides, the bag 10 is closed by seal seams 15 which may be formed by conventional heat sealing means where the material of the bag walls 13 is of a monofilament or laminar plastic structure, whichever may be preferred for the particular use to which the bag is to be put. At its upper end, the bag has separable pull flanges 17 which are upward extensions of the bag wall panels 13. Extending transversely across the base portions of the pull flanges 17 is a reclosable fastener 18 comprising complementary tongue and groove profiles 19 and 20, one of which is carried by the base of one of the pull flanges 17 and the other of which is carried by the base of the other of the pull flanges in cooperatively interengagable or more particularly separably interlockable relation one with the other. The profiles 19 and 20 may be integrally cast or extruded with the heat sealable plastic bag wall material or may be separately formed and attached thereto, as is well-known in this art. The principal function of the fastener 18 is to provide for reclosing the bag 10 after it has been opened for partial dispensing of contents.

In order to provide a thorough hermetic seal of the package 10 after filling and before opening the same for dispensing of contents, a peel seal 21 is provided inwardly adjacent to the reclosable fastener or zipper 18. In a desirable form, the peel seal 21 may comprise a stripe of adhesive material which is carried by and between the bag wall panels 13 throughout the width of the bag and of a character to maintain the mouth end of the bag sealed until the seal 21 is peeled open by the user pulling the pull flanges 17 apart. For this purpose, the peel seal 21 should be of an adhesive that remains reasonably pliable but of such a nature that it will maintain adequate adhesion for sealing the bag wall panels together until forcibly peeled from one of the panels by moderate pull apart force applied to the pull flanges 17. Thereafter, the peel seal 21 may or may not be resealable and may be liable to such contamination from contact with dispensed contents of the bag that effective resealing of the peel seal may be precluded. However, at this point, the reclosable zipper 18 may be relied upon for resealing the bag.

On the other hand, the peel seal may comprise a heat seal wherein the bag walls are sealed together sufficiently to maintain a hermetic seal until forcibly peeled apart by pulling the pull flanges 17 apart.

With conventional paper or paperlike bags to be inserted into a cereal box it has been common to gusset or fold the opposite corners of the bag to compensate for what may be referred to as the ear phenomenon which would present projections at the corners interfering with efficient mechanical handling and insertion of the bags into cereal boxes. Such ear phenomenon may also be present in heat sealed plastic bags. To compensate for the ear phenomenon in a simple, efficient, and economical manner, in respect to the plastic bag 10, chamferred sealed corners 22 are provided at the bottom end of the bag, and chamferred sealed corners 23 are provided at the top end of the bag. The chamfer seals 22 and 23 may be heat sealed extensions of the side heat sealed seams 15 and are thus adapted to be produced at the same time that the side seals 15 are produced. In order to facilitate forming the upper corner chamfer seals 23 which extend across the heat sealable profiles 19 and 20 of the zipper 18, and also to strengthen the ends of the zipper at the chamfer seals 23, the ends of the zipper are desirably spot sealed as shown at 24.

Desirably, the bag 10 may be made on and in connection with a conventional form, fill seal machine generally on the order of that disclosed in U.S. Pat. No. 4,355,494. That is, as shown in FIG. 2, the bag making material M may be supplied as a continuous ribbon to the forming tube nozzle of the form, fill, seal machine, identified in phantom at 25. The sheet material M is wrapped about the nozzle 25, and the zipper profiles 19 and 20 interlocked and the peel seal 21 sealed closed. Then, as the now tubularly wrapped material advances step-by-step, that is bag width by bag width relative to the nozzle 25, the spot seals 24 are formed at a distance of one bag blank upstream from where the immediately succeeding or downstream bag blank joins the bag blank in immediately upstream position. At this time, also, the immediately upstream bag section is thoroughly sealed along its advance edge to provide side seal 15 not only for this section but also for closing the downstream filled bag. Simultaneously with such sealing of said edges, the chamfer seals 22 and 23 are formed and triangular scrap portions T are removed where the chamfer seals are formed. The filled bag is then removed from the series and is moved on for further handling such as packing into one of the cartons 11. The upstream bag section which has been newly sealed along its advance edge is filled, and the process cycle continues step-by-step, each bag in succession being filled, sealed and separated from the series.

Figures 3, 4:
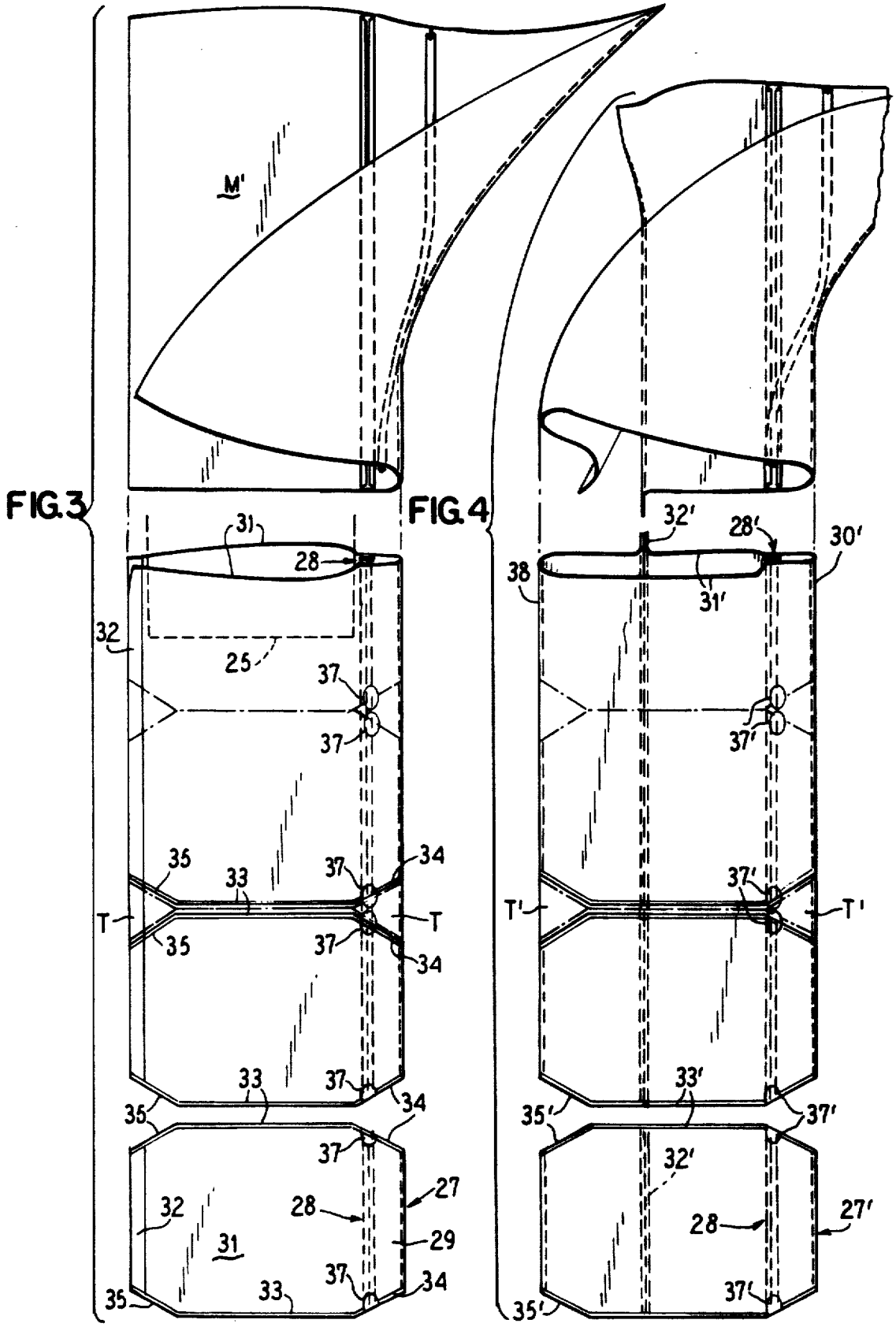

As shown in FIG. 3, a bag 27 which is in essential respects similar to the bag 10 is modified, so that placement of the zipper 28 is at the base of pull flanges 29 which are formed from a bag top fold 30 of the bag making material M', while the bag bottom end formed by wall panels 31 is closed by means of a seam in the form of a fin seal 32. Bag side seals 33 have a bag upper end chamfer seam seal extensions 34 and bag bottom end chamfer seam seal extensions 35. Spot seals 37 are formed at the opposite ends of the zipper 28 which in essential respect is similar to the zipper 18 in FIGS. 1 and 2. When forming bags 27 on a form, fill and seal machine, similarly as described for FIG. 2, the material M' is wrapped around the form and fill nozzle, and sealed together by a bag bottom fin seal 32. This allows for the zipper film to be delivered to the form fill and seal machine with the zipper interlocked and the spot seals 37 in place. As each bag section is advanced it is sealed along the side edge which is lowest in the series and separated from the preceding filled bag, and the triangular scrap pieces T removed.

In the arrangement shown in FIG. 4, all parts of the bag 27' are substantially the same as in the bag 27 that has been described in connection with FIG. 3, except that the bag bottom is formed by means of a return bent fold 38 and the fin seal 32' is formed transversely along one of the wall panels 31'. Aside from the difference in the bag bottom end fold closure 38 and the side fin seal 32', structure of the bag 27' and its manner of formation and filling are substantially the same as described in connection with FIG. 3, primed reference numerals being applied to show the substantial similarity.

In FIG. 5, is disclosed an arrangement wherein the bag material MM has zipper strips 39 extending across the length, i.e., the longitudinal axis, of the bag making material and located at suitable intervals on the material to provide reclosable top ends of successive bags. Thus, as the material MM is wrapped about and advanced along the forming nozzle of the form, fill, and seal machine, the material is sealed along a longitudinal seal fin 40 which will be located at one side of a finished bag 41 while the opposite side of the bag is closed by a fold 42. In the folded state of the material MM, the zipper strip 39, which is preferably of the known multi-hooked rib profile form, is folded upon itself and the profiles interlocked. Then, heat seals 43 are formed adjacent to the opposite ends of the folded zipper 39, thereby holding the zipper strips in position but separable along the length of the zipper between the heat seals 43. Along the top end of the bag, a limited pull flange length 44 is left after heat sealing the lower end of each succeeding bag along a heat seal 45 and with heat seal chamfer extensions 46 along each opposite sides. In forming the chamfers 46, there are simultaneously formed heat seal chamfers 47 on the upper end portions of the opposite sides of the immediately preceding bag. In forming the chamfers 46 and 47, triangular scrap portions of material 48 are removed along the sides of the bag section series. The end result is that the filled bag 41 is reclosable by means of its zipper 39.

In FIG. 6, the bag 41' is substantially the same as the bag 41 in FIG. 5, except that instead of the joining fin seal 40' being formed along one side of the bag 41', it is formed longitudinally along one of the bag wall panels. On the other hand, the side closure opposite the fold closure 42' is provided by a fold closure 49. Otherwise, the bag 41' and the manner of fabricating and filling the same are similar to that described in connection with the form of FIG. 5, and primed reference numerals indicate similarity of elements.

Although for most form, fill and seal usages the monolithic sheet or film material arrangements specifically described are advantageous, a twin sheet arrangement may be employed wherein a pair of sheet or film material pieces are matched and joined to provide a tubular structure for forming into the chamfered corner bags of the present invention.

It will be understood that variations and modifications may be effected without departing from the spirit and scope of the novel concepts of the present invention.

We claim as our invention:

1. In combination within a fairly close fitting carton, a four corner bag filled with a contents such as cereal, said bag being formed from sheet or film material having opposite wall panels providing a bag bottom and closed opposite sides, and said panels defining an openable bag top provided with a reclosable fastener along the inner ends of upstanding pull flanges, and comprising:

lower corner chamfer seals extending from said bag bottom to said bag sides;

upper corner chamfer seals extending from adjacent to the ends of said reclosable fastener to the top edges of said pull flanges;

so that the chamfer seals will free the four corners of the bag from interfering with easy reception and packing of the filled bag in said fairly close fitting carton; and a hermetic heated sealed peel seal inwardly adjacent to said reclosable fastener.

2. A combination according to claim 1, wherein both opposite sides of the bag comprise folds of the panel material.

3. A combination according to claim 1, wherein said bag bottom and said lower corner chamfer seals comprise a continuous heat seal.

4. A combination according to claim 3, wherein one of said opposite sides comprises a fold of the panel material and the other side comprises a heat seal seam.

5. A combination according to claim 4, wherein said side heat seal seam comprises a fin, and the adjacent lower corner chamfer seal extends to the free edge of said fin.

6. A combination according to claim 1, wherein said wall panels comprise parts of a folded monolithis piece of sheet or film bag material.

7. A combination according to claim 6, wherein said wall panels comprise matched separate pieces of sheet or film bag material.

8. In combination within a fairly close fitting carton, a four corner bag filled with a contents such as cereal, said bag being formed from sheet or film material having opposite wall panels providing a bag bottom and closed opposite sides, and said panels defining an openable bag top provided with a reclosable fastener along the inner ends of upstanding pull flanges, and comprising:

lower corner [chamfer] seals [extending from] *sealing* said bag bottom to said bag sides;

upper corner chamfer seals extending from adjacent to the ends of said reclosable fastener to the top edges of said pull flanges;

so that the chamfer seals will free the [four] *upper* corners of the bag from interfering with easy reception and packing of the filled bag in said fairly close fitting carton; and a peel seal connecting said panels inwardly adjacent to said reclosable fastener.

9. In combination within a fairly close fitting carton, a four corner bag filled with a contents such as a cereal, said bag being formed from sheet or film material having opposite wall panels providing a bag bottom and closed opposite sides, and said panels defining an openable bag top provided with a reclosable fastener along the inner ends of upstanding pull flanges, and comprising:

lower corner [chamfer] seals [extending from] *sealing* said bag bottom to said bag sides;

and upper corner chamfer seals extending from adjacent to the ends of said reclosable fastener to the top edges of said pull flanges;

so that the chamfer seals will free the [four] *upper* corners of the bag from interfering with easy reception and packing of the filled bag in said fairly close fitting carton, and both of said opposite sides comprising folds of said bag material, and edges of bag material being joined by a heat seal seam extending parallel to said folds from said [continuous heat seal] *bag bottom* to said pull flanges.

10. A method of making a four corner bag from sheet or film material in combination with a fairly closely fitting carton, and comprising forming said sheet material into opposite wall panels, joining the wall panels into a bag bottom and opposite bag sides, the panels defining an openable bag top having upstanding pull flanges, and providing the bag top with a reclosable fastener along the inner ends of said upstanding pull flanges, said method further comprising:

forming lower corner [chamfer] seals [extending from] *sealing* said bag bottom to said bag sides;

forming upper corner chamfer seals extending from adjacent to the ends of said reclosable fastener to the top edges of said pull flanges;

providing a contents such as cereal filling the bag;

effecting easy reception and packing of the filled bag in said fairly close fitting carton, free from interference from the [four] *upper* corners of the bag by virtue of said chamfer seals; and heat sealing a hermetic peel seal connecting said panels inwardly adjacent to said reclosable fastener.

11. A method of making a four corner bag from sheet or film material in combination with a fairly closely fitting carton, and comprising forming said sheet material into opposite wall panels, joining the wall panels into a bag bottom and opposite bag sides, the panels defining an openable bag top having upstanding pull flanges, and providing the bag top with a reclosable fastener along the inner ends of said upstanding pull flanges, said method further comprising:

forming lower corner [chamfer] seals [extending from] *sealing* said bag bottom to said bag sides;

forming upper corner chamfer seals extending from adjacent to the ends of said reclosable fastener to the top edges of said pull flanges;

providing a contents such as cereal filling the bag;

effecting easy reception and packing of the filled bag in said fairly close fitting carton, free from interference from the [four] *upper* corners of the bag by virtue of said chamfer seals;

forming said lower [chamfer] *corner* seals and said bag bottom as a continuous heat seal; and effecting both of said closed opposite sides by folding the bag material, and joining edges of said bag material by heat seal seaming parallel to said sides and extending from said [continuous heat seal] *bag bottom* to said pull flanges.

12. In combination within a fairly close fitting carton, a four corner bag filled with a contents such as cereal, said bag being formed from sheet or film material having opposite wall panels providing a bag bottom and closed opposite sides, and said panels defining an openable bag top provided with a reclosable fastener along the inner ends of upstanding pull flanges, and comprising:

pressure closable separable flexible complementary tongue and groove profiles along the inner top of the bag with pull flanges extending above the elements providing the openable bag top;

lower corner [chamfer] seals [extending from] *sealing* said bag bottom to said bag sides;

upper corner chamfer seals extending from adjacent to the ends of said reclosable fastener to the top edges of said pull flanges;

so that the chamfer seals will free the [four] *upper* corners of the bag from interfering with easy reception and packing of the filled bag in said fully close fitting carton;

so that the carton does not apply [and] *an* end force to the top edge of the bag to tend to separate the complementary tongue and groove elements;

said reclosable fasteners comprising complementary plastic profiles;

spot seals across said profiles in alignment with said upper corner chamfer seals, and said chamfer seals extending across said spot seals.

13. A method of making a four corner bag from sheet or film material in combination with a fairly closely fitting carton, and comprising forming said sheet material into opposite wall panels, joining the wall panels into a bag bottom and opposite bag sides, the panels defining an openable bag top having upstanding pull flanges, and providing the bag top with a reclosable fastener along the inner ends of said upstanding pull flanges, said method further comprising:

forming lower corner [chamfer] seals [extending from] *sealing* said bag bottom to said bag sides;

forming upper corner chamfer seals extending from adjacent to the ends of said reclosable fastener to the top edges of said pull flanges;

providing a contents such as cereal filling the bag;

effecting easy reception and packing of the filled bag in said fairly close fitting carton, free from interference from the [four] *upper* corners of the bag by virtue of said chamfer seals, said reclosable fasteners comprising tongue and groove zipper profiles; and forming spot seals across said profiles in alignment with said upper corner chamfer seals, and extending said upper corner chamfer seals across said spot seals.

14. A four corner bag formed from sheet or film material having opposite wall panels providing a bag bottom and opposite bag sides, and said panels defining an openable bag top provided with a heat sealable reclosable fastener extending from side to side of the bag top along the inner ends of upstanding pull flanges, and comprising:

lower corner [chamfer] seals [extending from] *sealing* said bag bottom to said bag sides;

upper corner chamfer seals extending from said bag sides adjacently below the ends of said reclosable fastener to the top edges of said pull flanges;

and spots seals across said ends of said reclosable fastener in alignment with said upper chamfer seals and said upper corner chamfer seals extending across said spot seals;

so that when the bag is filled, the chamfer seals will free the [four] *upper* corners of the bag from interfering with easy reception and packing of the filled bag in a fairly close fitting carton.

15. A method of making a four corners bag from sheet of film material and comprising forming said sheet material into opposite wall panels, joining the wall panels into a bag bottom and opposite bag sides, the panels defining an openable bag top having upstanding pull flanges, and providing the bag top with a heat sealable reclosable fastener extending from side to side of the bag along the inner ends of said upstanding pull flanges and said method further comprising:

forming lower corner [chamfer] seals [extending from] *sealing* said bag bottom to said bag sides;

forming upper corner chamfer seals extending from said bag sides adjacently below the ends of said reclosable fastener to the top edges of said pull flanges;

and forming spot seals across the ends of said reclosable fastener in alignment with said upper corner chamfer seals, and forming said upper corner chamfer seals across said spot seals;

so that when the bag is filled, the chamfer seals will free the [four] *upper* corners of the bag from interfering with easy reception and packing of the filled bag in a fairly close fitting carton.

* * * * *